(12) United States Patent
Schmidl

(10) Patent No.: US 10,801,601 B2
(45) Date of Patent: Oct. 13, 2020

(54) METHOD FOR OPERATING AN AUTOMATIC GEARBOX OF A MOTOR VEHICLE, AND AUTOMATIC GEARBOX FOR A MOTOR VEHICLE

(71) Applicant: AUDI AG, Ingolstadt (DE)

(72) Inventor: Lothar Schmidl, Kösching (DE)

(73) Assignee: AUDI AG, Ingolstadt (DE)

( * ) Notice: Subject to any disclaimer, the term of this patent is extended or adjusted under 35 U.S.C. 154(b) by 101 days.

(21) Appl. No.: 16/077,153

(22) PCT Filed: Feb. 20, 2017

(86) PCT No.: PCT/EP2017/053737
§ 371 (c)(1),
(2) Date: Aug. 10, 2018

(87) PCT Pub. No.: WO2017/144391
PCT Pub. Date: Aug. 31, 2017

(65) Prior Publication Data
US 2019/0048987 A1     Feb. 14, 2019

(30) Foreign Application Priority Data

Feb. 23, 2016   (DE) ........................ 10 2016 202 732

(51) Int. Cl.
*F16H 57/00*     (2012.01)
*F16H 61/02*     (2006.01)
*F16H 59/36*     (2006.01)

(52) U.S. Cl.
CPC ..... *F16H 57/0006* (2013.01); *F16H 61/0213* (2013.01); *B60W 2710/1005* (2013.01); *F16H 2059/366* (2013.01)

(58) Field of Classification Search
CPC .................. F16H 61/0213; F16H 57/0006
See application file for complete search history.

(56) References Cited

U.S. PATENT DOCUMENTS 4,274,306 A * 6/1981 Yokoi ................. F16H 61/0213
                                                477/121
6,778,895 B1 * 8/2004 Schwab .................. F16H 59/08
                                                701/1
(Continued)

FOREIGN PATENT DOCUMENTS

CN     101625023 A    1/2010
DE     34 08 492 C2   2/1990
(Continued)

OTHER PUBLICATIONS

Chinese Office Action dated Aug. 6, 2019, in connection with corresponding CN Application No. 201780012796.4 (16 pgs., including English translation).

(Continued)

*Primary Examiner* — David R Morris
(74) *Attorney, Agent, or Firm* — Maier & Maier, PLLC

(57) ABSTRACT

A method for operating an automatic gearbox of a motor vehicle. A shifting status of the automatic gearbox is set by a control device. Further, an acoustic signal in an interior of the motor vehicle is detected by a detection unit coupled to the control device. Finally, a shifting status of the automatic gearbox is switched from a first shifting status to a second shifting status by the control device when the acoustic signal exceeds a predetermined threshold value.

7 Claims, 1 Drawing Sheet

(56) References Cited

U.S. PATENT DOCUMENTS

| | | | | |
|---|---|---|---|---|
| 8,065,063 B2* | 11/2011 | Cho | ............ | F16H 59/02 |
| | | | | 477/125 |
| 2006/0129297 A1* | 6/2006 | Kim | ............ | F16H 63/42 |
| | | | | 701/55 |

FOREIGN PATENT DOCUMENTS

| | | | |
|---|---|---|---|
| DE | 100 12 725 A1 | 9/2000 | |
| DE | 100 62 224 A1 | 4/2001 | |
| DE | 102 22 665 A1 | 12/2003 | |
| DE | 10 2009 037 170 A1 | 2/2011 | |
| DE | 102009037170 A1 * | 2/2011 | ............ B60Q 1/506 |
| DE | 10 2013 204 798 A1 | 9/2013 | |
| DE | 10 2012 113 038 A1 | 6/2014 | |
| DE | 10 2014 006 290 A1 | 10/2015 | |
| EP | 1 669 642 A1 | 6/2006 | |
| EP | 2 090 454 A2 | 8/2009 | |
| JP | 2008-57569 A | 3/2008 | |
| JP | 2008-144859 A | 6/2008 | |

OTHER PUBLICATIONS

International Preliminary Report on Patentability dated Sep. 7, 2018 in corresponding International Application No. PCT/EP2017/053737; 6 pages.

Examination Report dated Feb. 22, 2017 of corresponding German application No. 10 2016 202 732.8; 10 pgs.

International Search Report and Written Opinion of the International Search Authority dated Jun. 14, 2017 of corresponding International application No. PCT/EP2017/053737; 16 pgs.

Office Action dated Mar. 5, 2020, in corresponding Chinese Application No. 201780012796.4; 17 pages.

Office Action dated Aug. 3, 2020 in corresponding Chinese Application No. 201780012796.4; 15 pages including English-language translation.

* cited by examiner

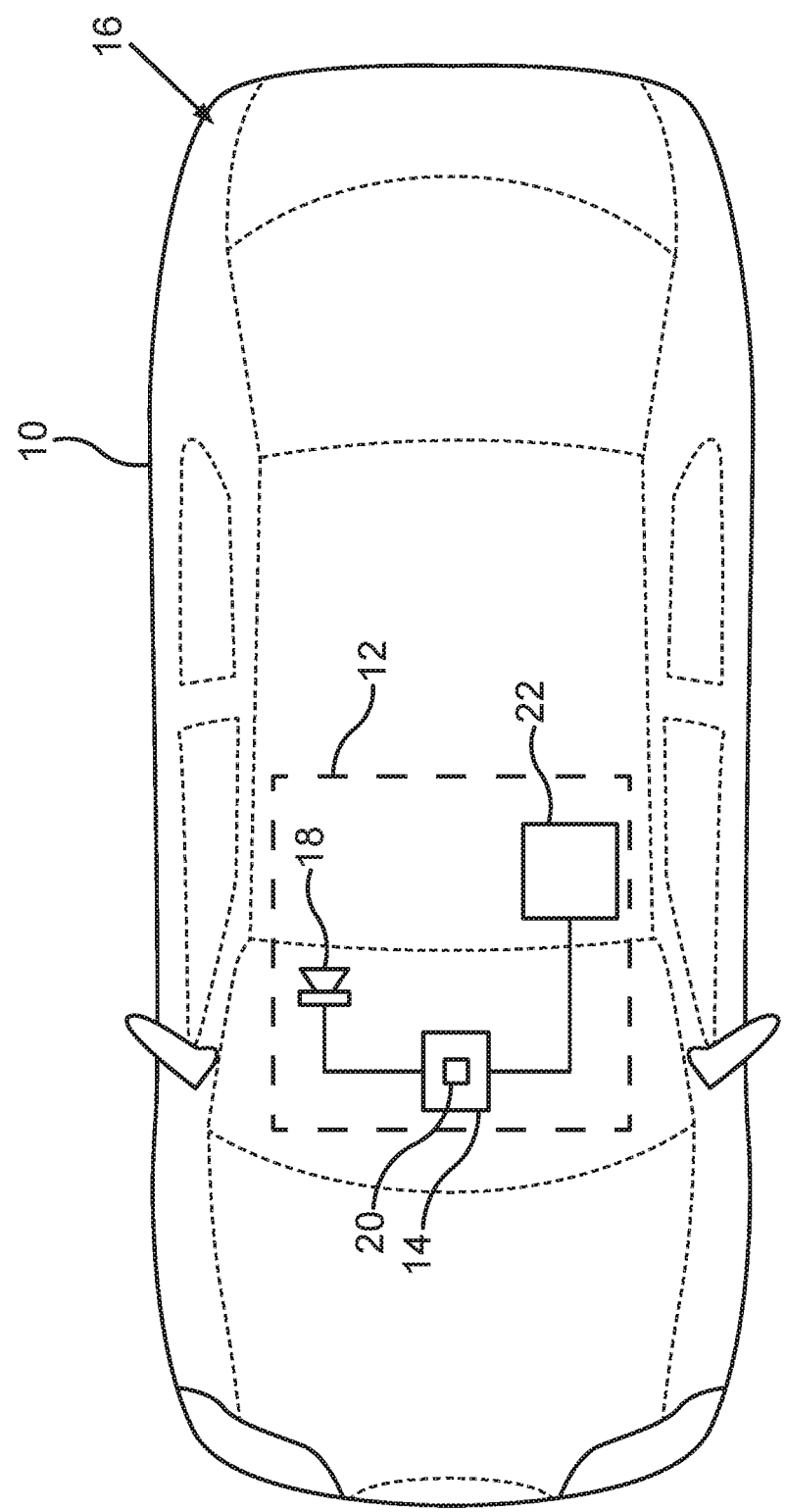

METHOD FOR OPERATING AN AUTOMATIC GEARBOX OF A MOTOR VEHICLE, AND AUTOMATIC GEARBOX FOR A MOTOR VEHICLE

FIELD

The invention relates to a method for operating an automatic gearbox of a motor vehicle and an automatic gearbox for a motor vehicle.

BACKGROUND

During operation of the motor vehicle, for example, during a drive with the motor vehicle, noise arises due to rotating or movably mounted vehicle components in the drivetrain of the motor vehicle, such as, for example, in the engine or in the gearbox, this noise also being perceptible in an interior of the motor vehicle.

In order to increase comfort in motor vehicles, various systems can be integrated into the motor vehicle for mitigation of noise in the motor vehicle.

For example, DE 10 2012 113 038 A1 proposes an apparatus for optimization of a noise in an interior of a vehicle. The vehicle itself has a drive, such as, for example, an internal combustion engine or an electric motor, and a drivetrain downstream to the drive. For noise optimization, the drive and/or the drivetrain are mounted by means of bearing elements on the vehicle body. In this case, at least one bearing element has an actuator as an oscillation or vibration generator that generates oscillations whose frequencies are superimposed on the order spectrum of a drive noise. The disadvantage of such an apparatus consists in the fact that the drive noise is additionally present and can lead to an excitation of oscillations of other components in the vehicle, which in turn can contribute to a disturbing development of noise. Further, for noise optimization, additional components are necessary in the vehicle, which makes the construction more complex and expensive, in this case, the bearing of the drive and/or the drivetrain. Additional vehicle components take up packing space in the vehicle and also increase the weight of the vehicle.

During operation of the motor vehicle, the development of noise not only occurs in the region of the drivetrain of the motor vehicle, but also in the interior of the motor vehicle, when the driver or the automatic gearbox, for example, moves into a specific rotational speed spectrum in a driving situation in which resonance occurs.

In order to counteract noise when changing gears, DE 10 2014 006 290 A1 proposes a method for operating a clutch device. In the method, the clutch device is controlled by a control device. In this case, in a first coupling state, the control device exclusively couples a first group of wheels to a drive device, and in a second coupling state, the control device couples both the first as well as a second group of wheels to the drive device. When a switchover condition is fulfilled in the first coupling state, the clutch device is transferred to the second coupling state by the control device during a predetermined time interval. During at least one part of the time interval, an actuator is actuated by the control device by way of an actuating signal for generating a sound signal that at least partially compensates for a noise generated by a switchover of the coupling state. The generation of the sound signal for noise compensation during a shifting process is to be fine-tuned particularly precisely to the shifting process. Now, when there is a frequent change of gears, such as, for example, in driving to accelerate the motor vehicle, the actuator must act particularly reliably and rapidly, in order to generate a counter-sound for noise compensation. This places a high requirement on the configuration of the clutch device and thus increases the complexity of the clutch device.

Instead of compensating for noise, noise can also be utilized, such as, for example, in a voice control. For this purpose, DE 102 22 665 A1 describes a method for the configuration of an electronic drive in a motor vehicle. For this purpose, selectable shifting programs are offered to a user of the motor vehicle on an input unit for the configuration of the electronic gearbox controller. The user selects individual shifting programs from the shifting programs offered.

Based on the shifting programs selected by the individual user, the electronic gearbox is configured, by signal transmission or speech input, for the individual user. By way of the speech input, in fact, the operation is configured in a simpler way for the user and thus comfort increases for the user. Nevertheless, an additional speech control contributes to the background noise in the motor vehicle, whereby, for example, other vehicle passengers may feel disturbed.

SUMMARY

Therefore, it is the object of the invention to provide a method for operating an automatic gearbox as well as an automatic gearbox that increase comfort in the motor vehicle.

According to the invention, this object is achieved by a method for operating an automatic gearbox of a motor vehicle. In this case, a shifting status of the automatic gearbox is set by means of a control device. Further, an acoustic signal in an interior of the motor vehicle is detected by means of a detection unit coupled to the control device. The method is characterized in that the shifting status is switched from a first shifting status to a second shifting status by means of the control device when the acoustic signal exceeds a predetermined threshold value. In other words, if the detected acoustic signal exceeds the threshold value, a gear change is initiated automatically, preferably into a gear lying next to it, by the control device. In this way, the advantage results that the reason for the acoustic signal will be will be entered into directly, thus actively, and not at all does there occur first a development of noise in the interior of the motor vehicle.

The invention is based on the knowledge that a development of noise can occur in the region of the drivetrain of the motor vehicle, noise that is perceptible in the interior of the motor vehicle, for example, in the case of high rotational speeds, depending on the speed of the motor vehicle. By interior is preferably meant a cabin space, thus the space in which the driver and/or the passengers are situated during a drive in the motor vehicle. Further, such development of noise in the region of the drivetrain leads to an excitation of vibrations in other vehicle components, such as, for example, the windshield or the steering wheel in the interior of the motor vehicle. Such oscillation excitation—that is also referred to as resonance—leads to the circumstance that the driver of the motor vehicle increasingly perceives the noise that is caused by the drivetrain. In order to prevent such resonance, in particular automatically, when the acoustic signal exceeds the threshold value in the interior of the motor vehicle, a gear change is initiated by the control device of the automatic gearbox.

Further, the invention is based on the knowledge that when noise that originates from the drivetrain of the motor vehicle develops in the interior of the motor vehicle, said noise development is an indication of the fact that a suboptimal gear, i.e., a gear that is not optimal for a current rotational speed of the engine, is engaged. With a development of noise, a gear change thus also has the advantage of reducing the load factor of the motor vehicle. The efficiency can be increased thereby. Further, a timely gear change reduces the fuel consumption of the motor vehicle.

In order to implement the gear change or the switching from one shifting status—first shifting status—to another shifting status—second shifting status—when the acoustic signal is detected, the detection unit can transmit the acoustic signal to the control device as an electrical detection signal. Consequently, the control device can be equipped for the purpose of analyzing the acoustic signal, for example, in that the control device compares the received acoustic signal to a threshold value stored in the control device. The threshold can be deposited in the form of data in a memory of the control device. Then, if a value of the acoustic signal is higher than the value of the threshold value stored in the control device, the control device can change a shifting status by carrying out a change from the first shifting status to the second shifting status. In other words, in this case, the control device can preferably shift either up or down into a gear lying next to it. Thus, for example, the control device can shift up with a gear change from a first gear to a second gear or from a second gear to a third gear or from a third gear to a fourth gear or from a fourth gear to a fifth gear or to a still higher gear, depending on the number of gears in the automatic gearbox. Analogously, the control device can also shift down gear for gear. A switching from the first shifting status to the second shifting status is thus meant to be a gear change from a currently engaged gear into a gear that is different from the engaged gear.

One embodiment of the invention provides that a frequency value of a noise in the interior and/or a frequency value of a vibration of a motor vehicle component in the interior can be detected as an acoustic signal. Noise preferably means an airborne sound here. In particular, a disturbing noise or a disturbing noise pattern is detected as an acoustic signal by the detection unit. For example, the disturbing noise or the disturbing noise pattern involves a humming or a buzzing or a whistling or a whine. Frequency value preferably means a value of a frequency, such as, for example, 50 Hz.

The airborne sound or the noise can lead to the circumstance that vehicle components are excited to vibrations that can in turn emit another acoustic signal, i.e., a noise, due to their vibration. A structure-borne sound is induced in the vehicle components due to the vibration excitation. A structure-borne sound is a sound that propagates in the solid structure, thus, for example, in the motor vehicle components. For example, a noise emitted from the drivetrain can excite a steering wheel or a windshield in the vehicle to vibrations. A driver who steers the motor vehicle can perceive the oscillations of the steering wheel (structure-borne sound), for example, as vibration. The vibration of the driving wheel and also of the drivetrain can induce an acoustic signal. This can lead to a resonance effect and in this way, the noise level in the interior of the motor vehicle can be increased or amplified.

In order to detect the airborne sound and/or the structure-borne sound, the automatic gearbox can have an acoustic sensor. For example, the acoustic sensor may have a microphone, which detects a frequency value or a frequency of the noise in the interior of the motor vehicle. The microphone is preferably equipped for the purpose of detecting the acoustic signal, of transforming it into an electrical signal, and of passing it on to the control device. Alternatively or additionally, the acoustic sensor can also have a vibration sensor or an oscillation sensor for detecting the structure-borne sound or the vibration of the motor vehicle components. An acoustic signal can be detected in a particularly reliable manner by the acoustic sensor.

In order that the control device can compare the detected acoustic signal with the threshold value, the threshold value can also preferably be a value of a frequency. In order to establish the threshold value, for example, a frequency of a noise, starting from which a noise is perceived as disturbing, can be determined by test persons during testing.

In an advantageous way, when the predetermined threshold value is exceeded, the control device can further transmit an output signal to an output device, which displays output information after receiving the output signal. The output device may involve, for example, an insert in the dash panel of the motor vehicle and/or a touch screen. The touch screen can preferably be arranged in a center console of the motor vehicle. A symbol, such as, for example, an arrow can be displayed as output information. The output information can serve for the purpose of delivering a shifting request to a driver of the motor vehicle, when the automatic gearbox is manually operated, for example.

Another embodiment of the invention provides that an acoustic ambient signal, in particular from the environment of the motor vehicle, can be detected by means of another detection unit coupled to the control device, wherein, when an acoustic environmental signal is detected, the acoustic environmental signal can be filtered out by means of the control device. The detected acoustic environmental signal preferably remains disregarded. In this way, environmental noise outside the motor vehicle can be prevented from initiating a gear change.

In an advantageous manner, when the threshold value is exceeded, the control device can further examine the acoustic signal by means of a plausibility criterion. As a plausibility criterion, an operating parameter of the motor vehicle, in particular a current operating parameter, can be examined preferably as plausibility criterion. For the plausibility check, it can be examined, for example, whether the operating parameter lies inside or outside a predetermined reference interval, wherein a switching from the first shifting status to the second shifting status is carried out by the control device when the at least one operating parameter lies outside the predetermined reference interval. The reference interval or the reference intervals can be stored in the memory of the control device. An operating parameter can be a rotational speed of the engine, for example. For example, a rotational speed interval can then be provided for a currently engaged gear. If the acoustic signal exceeds the threshold value, then the control device can simultaneously examine a current rotational speed of the engine. If the rotational speed of the engine then lies outside the rotational speed interval that is admissible for the engaged gear, then the control device can initiate a gear change.

Additionally or alternatively, a frequency pattern can be examined as a plausibility criterion. The frequency pattern can preferably be filed in the memory of the control device. In order to be able to provide the frequency pattern, in particular in the form of data, the frequency pattern with which the acoustic signal is examined can be subjected to a frequency analysis. In the case of said frequency analysis, for example, a frequency value or frequency pattern of a disturbing noise can be analyzed. In the case of the frequency analysis, for example, a humming can be analyzed as the frequency pattern. The frequency pattern can then be recreated thereby, and, for example, can be filed in the memory of the control device. If the acoustic signal exceeds the threshold value, then the control device can examine the acoustic signal with the stored frequency pattern. If the acoustic signal lies in the frequency pattern, then the control device can initiate a gear change.

Due to the examination by means of a plausibility criterion, the advantage results that an erroneous gear change is avoided and errors are thereby reduced in the case of the gear selection.

An automatic gearbox for a motor vehicle is also part of the invention. The automatic gearbox comprises a control device and a detection unit that is coupled to the control device. "Coupled" means here that the control device and the detection unit are connected together electrically or by signal technology. The control device is equipped for the purpose of adjusting a shifting status of the automatic gearbox. The detection unit of the automatic gearbox is equipped for the purpose of detecting an acoustic signal. The automatic gearbox is characterized in that the control device is further equipped for the purpose of switching a shifting status of the automatic gearbox from a first shifting status to a second shifting status, if the acoustic signal exceeds a predetermined threshold value.

Finally, a motor vehicle having an automatic gearbox is also a part of the invention. The automatic gearbox may involve the automatic gearbox according to the invention.

The features indicated for the method according to the invention and its embodiments, combination of features, and advantages thereof apply in the same way to the automatic gearbox according to the invention and the motor vehicle according to the invention.

BRIEF DESCRIPTION OF THE DRAWING

An example of embodiment of the invention is described in the following. For this purpose, FIG. 1 shows a schematic representation of an embodiment of the motor vehicle according to the invention.

DETAILED DESCRIPTION

The exemplary embodiment explained in the following involves a preferred embodiment of the invention. In the case of the exemplary embodiment, the described components of the embodiment in each case represent individual features of the invention that are to be considered independent from one another, each of the features also enhancing the invention independent from one another and thus are also to be viewed as a component of the invention, individually, or in a combination that is different from that shown. In addition, the described embodiment can also be supplemented by other features of the invention that have already been described.

FIG. 1 shows a motor vehicle 10, which may involve, for example, an automobile, in particular, a passenger vehicle. The motor vehicle 10 is shown in a top view in the FIGURE.

An automatic gearbox 12 is arranged in the motor vehicle 10. The automatic gearbox 12 is controlled by a control device 14. The automatic gearbox 12 is designed such that the gears are shifted automatically as a function of the driving conditions of the motor vehicle 10, such as, for example, the driving speed of the motor vehicle 10 and other influence factors, in order to obtain desired vehicle operating properties. However, the automatic gearbox 12 can also be actuated manually by a driver, i.e., the driver engages a desired gear by an actuation of a shift lever of the automatic gearbox 12.

During a drive of the motor vehicle 10, noise may occur in an interior 16 of the motor vehicle at certain speeds of the motor vehicle 10 or at certain rotational speeds. This noise may be brought about as a result of various causes. For example, it may occur in the case of an engaged gear relative to a high rotational speed of the engine. In this case, for example, a driver of the motor vehicle 10 may perceive as noise a humming in the interior 16 of the motor vehicle 10. A development of noise may also occur under other operating points of the motor vehicle 10. If the motor vehicle 10 or an engine of the motor vehicle 10 must expend greater effort, such as, for example, in driving up a hill, then it may happen that rotating or movably mounted vehicle components of a drivetrain of the motor vehicle 10 transfer oscillations to other vehicle components in the interior 16 of the motor vehicle 10, such as, for example, a steering wheel or a windshield. For example, the windshield starts to vibrate; thus, the vibration thereof can contribute to a development of noise in the interior 16 of the motor vehicle and intensify the noise already present.

In order to reduce the noise in the interior 16 of the motor vehicle 10, or to be able to almost not allow it to arise, a method for operating the automatic gearbox 12 will be described more precisely in the following.

In order to prevent a development of noise, a detection unit 18 of the automatic gearbox 12 can be arranged in the interior 16 of the motor vehicle 10. The detection unit 18 is coupled to the control device 14 of the automatic gearbox 12. For example, the detection unit 18 can be designed as an acoustic sensor. The acoustic sensor comprises, for example, a microphone and/or an oscillation sensor. For example, in this case, the microphone can be arranged in a roof liner of the motor vehicle 10. Alternatively, the microphone can also be a component of an infotainment system of the motor vehicle and can be arranged in a center console of the motor vehicle 10. The vibration sensor can be arranged, for example, on the steering wheel and/or the windshield.

The detection unit 18 is equipped for the purpose of detecting an acoustic signal in the interior 16 of the motor vehicle 10. If the detection unit 18 comprises the microphone, then the microphone can detect an airborne sound, thus a noise, in the interior 16 of the motor vehicle 10. Alternatively or additionally to the microphone, for example, if the detection unit 18 comprises the vibration sensor, then the vibration sensor can detect a structure-borne sound, thus a vibration. If the vibration sensor is arranged on the windshield, for example, then the vibration sensor can detect the vibration of the windshield.

After detecting the acoustic signal, the microphone can transmit the acoustic signal, for example, as an electrical detection signal, to the control device 14. The control device 14 subsequently analyzes the detected acoustic signal. For example, the control device 14 can compare the acoustic signal to a threshold value stored in the control device 14. The threshold value can be stored in a memory 20 of the control device 14. If the acoustic signal, i.e., a frequency value of the acoustic signal, exceeds the threshold value, then the control device 14 is equipped for the purpose of automatically changing a shifting status of the automatic gearbox 12. In other words, if the frequency value of the acoustic signal is greater than the threshold value, then the control device 14 is equipped for the purpose of automatically changing a shifting status of the automatic gearbox 12. The control device 14 then makes a change from a first shifting status to a second shifting status. The gears of the automatic gearbox 12 fall under the shifting status. If a shifting status of the automatic gearbox 12 is set by the control device 14, then a currently engaged gear is automatically changed to another gear.

In order that the control device 14 does not simply alternate between the shifting statuses for each detected acoustic signal that lies above a predetermined threshold value, it can be provided that the control device is further designed for the purpose of examining the detected acoustic signal with a plausibility criterion.

For example, an operating parameter of the automatic gearbox or a frequency pattern can be examined as a plausibility criterion. A current engine rotational speed can be drawn on, for example, as an operating parameter. The current engine rotational speed can then be examined in the plausibility test, for example, with an operating parameter reference value that is assigned to a shifting status, or to a reference interval. The operating parameter reference value and/or the reference interval and/or the frequency pattern can be stored in the memory of the control device 14.

In the case of the plausibility test with the operating parameter, if the acoustic signal exceeds the predetermined threshold value, for example, an engine rotational speed is simultaneously detected by the control device 14. If, for example, the detected engine rotational speed lies within the reference interval that is admissible for the engaged shifting status, then a gear change is not initiated by the control device 14. That is, a switching of the shifting status from a first shifting status to a second shifting status does not then result. A switching of the shifting status—from the first shifting status to the second shifting status—would then be initiated by the control device only when the plausibility criterion is fulfilled. This would be the case, for example, if, in the case of exceeding the threshold value, the detected engine rotational speed should also lie outside the reference interval.

For the plausibility test with the frequency pattern, for example, a predetermined frequency pattern can be stored in the memory 20 of the control device 14. If the acoustic signal is detected, then the control device 14 compares the detected acoustic signal with the frequency pattern stored in the control device 14. For example, the frequency pattern can represent a monotonic humming. If the detected acoustic signal does not fall in the frequency pattern, then a switching of the shifting status would not occur.

The control device 14 of the automatic gearbox 12 is further coupled to an output device 22. The output device 22 preferably involves a dash-panel insert. If the automatic gearbox 12 is manually operated, for example, then it can be provided that a change in the shifting status is displayed to the driver of the motor vehicle 10. For this purpose, as soon as it determines that the acoustic signal exceeds the predetermined threshold value, the control device 14 can transmit an output signal to the output device 22, which consequently displays a symbol, for example, an arrow. This arrow shall symbolize to the driver to which adjacent-lying gear he should shift. If the arrow is directed upward, thus in the direction of a roof of the motor vehicle 10, this symbolizes to the driver that he should shift up one gear. In contrast, if the arrow is directed downward, thus in the direction of a floor of the motor vehicle 10, this symbolizes to the driver that he should shift down one gear.

Thus, an overview of a gear change in the case of noise identification is described.

When certain rotational speeds or speeds of the motor vehicle are passed through or maintained, noise may occur in the interior of the vehicle due to excitation. This excitation will be generated for the most part by resonances at certain operating points of the motor vehicle.

The driver will be bothered by noise in the interior of the vehicle. This is not acceptable, in particular for a premium vehicle. In addition, vibrations can occur in various components (e.g.: steering wheel), which are also unpleasant upon contact.

Already installed microphones or microphones retrofitted in the interior identify disruptive noises or frequencies and provide by the communication architecture in the motor vehicle the command to the automatic gearbox to shift to the adjacent gear, in which the disruptive frequency does not occur in this case of operation. For this purpose, the microphones receive the disruptive frequency and provide by the communication architecture of the vehicle a shift command to the gearbox.

In the case of manual shift gearboxes and/or in the case of automatic gearboxes in manual function, a display in the dash-panel insert can advise a gear change.

In this way, the driver is no longer bothered by disruptive noise, such as, for example, a humming and/or a whistling, and/or is no longer is bothered by vibrations.

The invention claimed is:

1. A method for operating an automatic gearbox of a motor vehicle comprising:
    setting a shifting status of the automatic gearbox by a control device;
    detecting an acoustic signal in an interior of the motor vehicle by a detection unit coupled to the control device; and
    switching from a first shifting status to a second shifting status by the control device when the acoustic signal exceeds a predetermined threshold value,
    wherein when the threshold value is exceeded, the control device further examines the acoustic signal by a first plausibility criterion, and
    wherein a frequency pattern of the acoustic signal is examined as the first plausibility criterion,
    wherein the frequency pattern includes a monotonic humming.

2. The method according to claim 1, wherein a frequency value of a noise in the interior and/or a frequency value of a vibration of a motor vehicle component in the interior is detected as acoustic signal.

3. The method according to claim 1, wherein in the case of exceeding the predetermined threshold value, the control device can further transmit an output signal to an output device, which displays output information after receiving the output signal.

4. The method according to claim 1, wherein an acoustic environmental signal, in particular from the environment of the motor vehicle, is detected by another detection unit coupled to the control device, wherein, when the acoustic environmental signal is detected, the acoustic environmental signal is filtered out by the control device.

5. The method according to claim 1, wherein an operating parameter of the motor vehicle is examined as a second plausibility criterion.

6. An automatic gearbox for a motor vehicle comprising:
    a control device that is equipped for the purpose of setting a shifting status of the automatic gearbox;
    a detection unit that is coupled to the control device and that is equipped for the purpose of detecting an acoustic signal;
    wherein the control device is further equipped for the purpose of switching the shifting status from a first shifting status to a second shifting status, if the acoustic signal exceeds a predetermined threshold value, wherein when the threshold value is exceeded, the control device further examines the acoustic signal by a first plausibility criterion, and wherein a frequency pattern of the acoustic signal is examined as the first plausibility criterion, wherein the frequency pattern includes a monotonic humming.

7. The automatic gearbox according to claim 6, wherein the detection unit is designed as an acoustic sensor, in particular as a microphone and/or as an oscillation or vibration sensor.

* * * * *